June 6, 1972  A. KRIVDA  3,667,814
VACUUM LOADER

Filed Sept. 4, 1970  2 Sheets-Sheet 1

INVENTOR.
ALFRED KRIVDA
BY
Alexander R. Blair
ATTORNEY.

June 6, 1972          A. KRIVDA          3,667,814
VACUUM LOADER
Filed Sept. 4, 1970          2 Sheets-Sheet 2
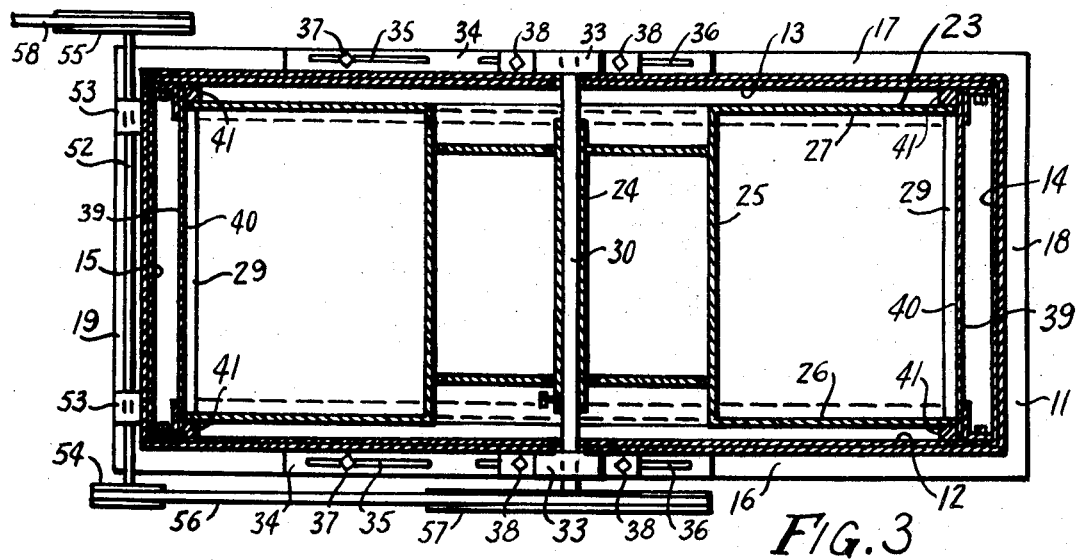
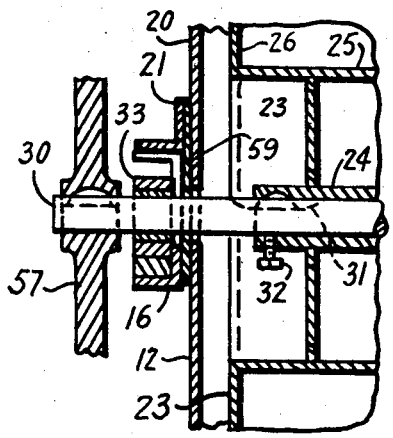
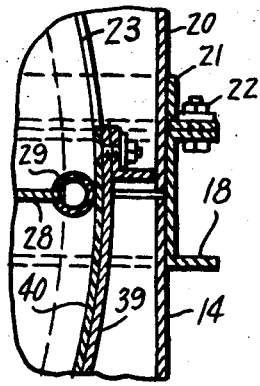
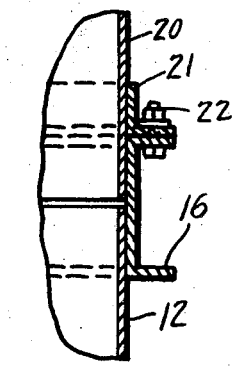
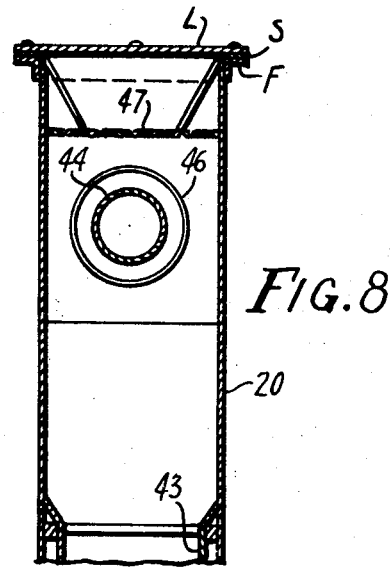
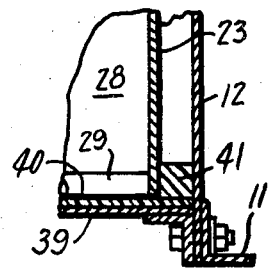
INVENTOR.
ALFRED KRIVDA
BY
Alexander B. Blair
ATTORNEY.

United States Patent Office 3,667,814
Patented June 6, 1972

3,667,814
VACUUM LOADER
Alfred Krivda, P.O. Box 1055, Oroville, Calif. 95965
Filed Sept. 4, 1970, Ser. No. 69,602
Int. Cl. B65g 53/24, 53/40, 53/60
U.S. Cl. 302—59
1 Claim

ABSTRACT OF THE DISCLOSURE

A vacuum loading apparatus for transferring dry particulate material from a storage point to a point of use or to a transport vehicle. The loader includes a pocketed wheel which is sealed against escape of air through the pockets or around the wheel. The pocketed wheel is rotated so that material drops into a pocket at the upper side of the wheel and is delivered through a discharge opening at the lower side of the wheel. A system including a flexible hose delivers the dry material to a hopper overlying the pocketed wheel. The air flow passes through a filter above the hopper and then to a suction fan to provide the power.

FIELD OF THE INVENTION

The present relates to vacuum loaders for dry material such as fertilizer, cement, and other particulate materials which are normally stored in bins and then loaded onto trucks for transportation to the user. The vacuum loader can be used at any point where the material is being transferred.

SUMMARY OF THE INVENTION

The present invention includes a vacuum loader in which a flexible pipe is used to pick up the material under a vacuum with the material and air being delivered to a separation point where the air flows through a filter overlying a hopper into which the material is fed. A pocketed wheel under the hopper receives the material and turns to deliver the material through a discharge opening. The pocketed wheel is sealed to prevent the flow of air therethrough or thereby.

The primary object of the invention is to provide a vacuum loader in which the air and dry particulate material are completely separated prior to delivery of the dry material from the loader.

Other objects and advantages will become apparent in the following specification when considered in light of the attached drawings.

BRIEF DESCRIPTION OF THE DRAWINGS

FIG. 3 is an enlarged horizontal cross-section taken along the line 3—3 of FIG. 1, looking in the direction of the arrows;

FIG. 4 is a enlarged fragmentary vertical cross-section taken along the line 4—4 of FIG. 1, looking in the direction of the arrows;

FIG. 5 is an enlarged fragmentary vertical cross-section taken along the line 5—5 of FIG. 1, looking in the direction of the arrows;

FIG. 6 is an enlarged fragmentary vertical cross-section taken along the line 6—6 of FIG. 2, looking in the direction of the arrows;

FIG. 7 is an enlarged fragmentary vertical cross-section taken along the line 7—7 of FIG. 1, looking in the direction of the arrows; and FIG. 8 is a fragmentary vertical cross-section taken along the line 8—8 of FIG. 1, looking in the direction of the arrows.

DESCRIPTION OF THE PREFERRED EMBODIMENT

Figure 1:
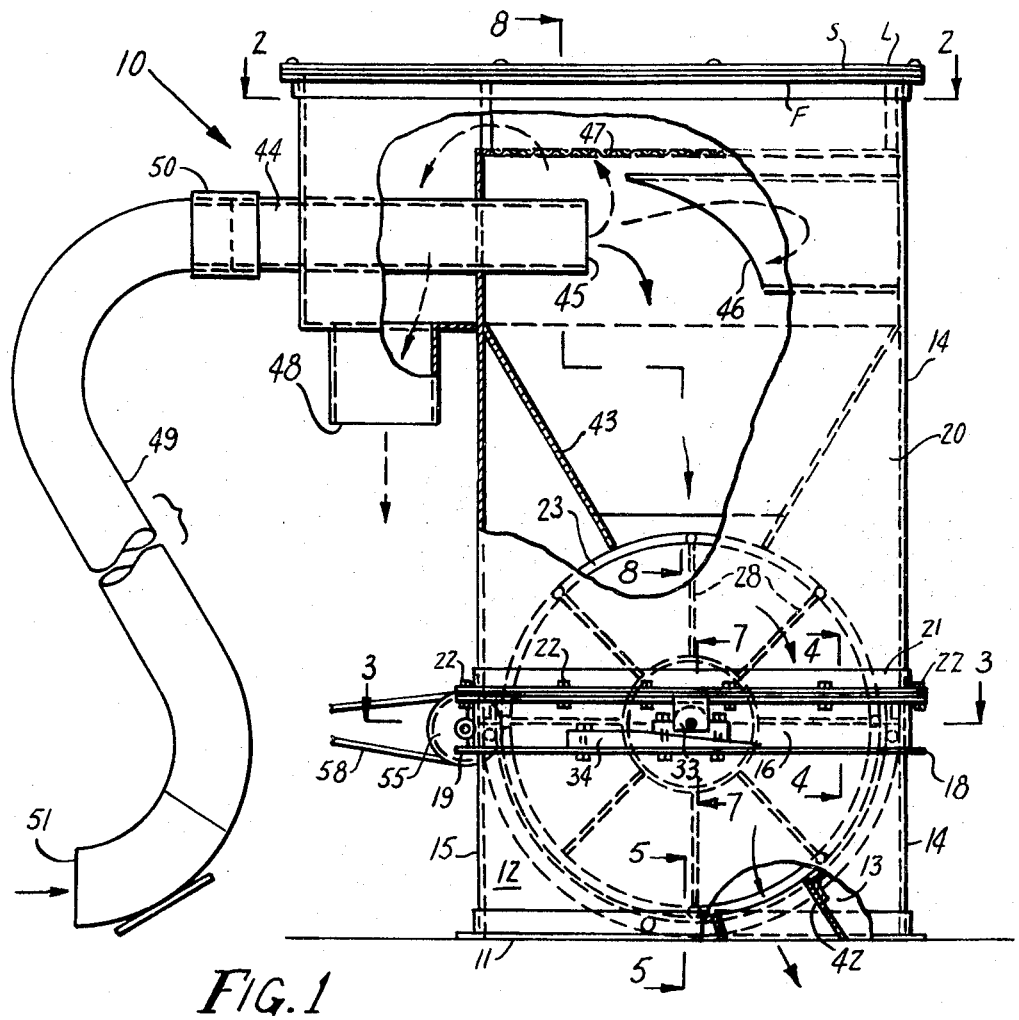
FIG. 1 is a side elevation of the invention shown partially broken away and in section for convenience of illustration.
Figure 2:
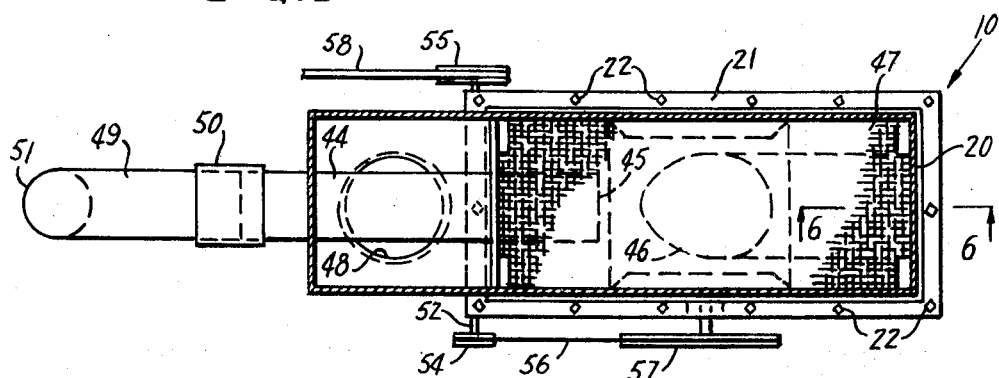
FIG. 2 is a horizontal sectional view taken along the line 2—2 of FIG. 1, looking in the direction of the arrows.

Referring now to the drawings in detail wherein like reference characters indicate like parts throughout the several figures the reference numeral 10 indicates generally a vacuum loader constructed in accordance with the invention.

The vacuum leader 10 includes a generally rectangular angle iron base frame 11 having a pair of upstanding side walls 12, 13 secured thereto and extending upwardly therefrom, and a pair of end walls 14, 15 integrally connecting the side walls 12, 13 at their opposite ends.

A generally horizontal channel member 16 is secured to the outer face of the upper portion of the side wall 12 and extends upwardly therefrom with the legs of the channel 16 projecting outwardly. A similar channel member 17 is secured to the top of the side wall 13. A generally horizontal channel member 18 is secured to the upper edge of the end wall 14 and integrally connects the adjacent ends of the channel members 16, 17. A channel member 19 is connected to the upper end of the end wall 15 and integrally connects the adjacent ends of the channel 16, 17.

A generally rectangular housing 20 has a base flange 21 integrally secured thereto adjacent to but spaced upwardly from the lower edge of the housing 20. The housing 20 extends into the channel members 16, 17, 18, 19 into engagement with the upper ends of the side walls 12, 13 and the end walls 14, 15. The flange 21 is bolted to the channels 16, 17, 18 and 19 by a plurality of bolts 22. A sealing gasket G is positioned between the flange 21 and the channels.

A pocketed wheel 23 is provided with a hollow shaft 24 extending transversely thereof and has a central drum 25 integrally secured to the shaft 24. A pair of generally circular side plates 26, 27 are arranged in spaced parallel relation and are secured centrally to the drum 25. A plurality of radially extending partitions 28 are secured integrally to the drum 25 and to the side walls 26, 27 to form therewith a plurality of pockets open around the periphery. Each of the partitions 28 have a tubular top edge 29 which extends parallel to the axis of the wheel 23 for reasons to be assigned.

A solid shaft 30 extends through the hollow shaft 24 and is locked thereto by a key 31 and set screw 32 (see FIG. 7). The shaft 30 is journalled in a bushing 33 at each end thereof with each of the bushings 33 being supported on a wedge 34 carried by the channel members 16, 17 respectively. The wedges 34 are provided with longitudinally extending vertical adjusting slots 35, 36 through which the mounting bolts 37, 38 extend. The wedges 34 are longitudinally adjustable to adjust and align the wheel 23.

A semi-circular seal plate 39 is mounted in the loader 10 adjacent the bottom thereof and is arranged with its axis parallel to the axis of the shaft 30. A resilient seal 40 is secured to the inner face of the seal plate 39 and is engaged by the tubular ends 29 of the partitions 28 as well as the side walls 26, 27. A pair of circular guides 41 are arranged on opposite sides of the seal 40 to retain and guide the wheel 23 therebetween. The seal 40 extends slightly more than 180° so as to provide a complete seal for the wheel 23. A delivery chute 42 is mounted in the bottom of the loader 10 and opens through the seal plate 39 and seal 40 adjacent the bottom thereof to receive material from one of the compartments in the pocketed wheel 23.

A tapered hopper 43 is mounted in the housing 20 and is arranged with its lower end overlying the wheel 23 to deliver dry material by gravity into the pockets of the wheel 23.

A suction pipe 44 extends horizontally into the housing 20 terminating at 45 at a point overlying the hopper 43. A generally horizontal pipe 46 is arranged in aligned relation but spaced from the suction pipe 44 so that material can be delivered therein and flow therefrom by gravity to serve as a brake for the velocity of the material. A filter 47 is mounted in the housing 20 overlying the suction pipe 44 and the hopper 43 to permit air entering through the suction pipe 44 to flow outwardly therethrough while preventing the entrained dry material from flowing therethrough.

A flange F is secured to the top edges of the housing 20 and a lid L is bolted thereto with a sealing gasket S positioned between the flange F and the lid L.

A pipe 48 is connected to the housing 20 in a position to receive air from above the filter 47. The pipe 48 is connected by any suitable means (not shown) to a suction pump (not shown). A flexible hose 49 is connected to the suction pipe 44 by a coupling 50 and the open end 51 of the suction pipe 48 is used to extract dry material from a storage point.

A jack shaft 52 is journalled on the channel member 19 in bushings 53. The jack shaft 52 has a sprocket 54 on one end and a sprocket 55 on the opposite end. A chain 56 connects the sprocket 54 to a sprocket 57 mounted on the outer end of the shaft 30. A belt 58 is trained over the sprocket 55 and extends to the shaft of the suction pump (not shown) to receive its driving power therefrom.

The wheel 23 is vertically adjustably on the wedges 34 so that as the seal 40 wears the wheel can be lowered so that sealing contact of the wheel with the seal 40 is maintained. Floating seals 59 surround the shaft 30 at each end thereof and engage the side walls 12, 13 respectively to maintain a seal between the shaft 30 and the side walls 12, 13.

Having thus described the preferred embodiments of the invention it should be understood that numerous structural modifications and adaptations may be resorted to without departing from the spirit of the invention.

What is claimed is:

1. A vacuum loader comprising a housing, a pocketed wheel, means mounting said wheel for rotation and vertical adjustment in said housing, a peripheral seal in said housing in contact with and underlying said wheel and having its opposite ends extending to a point above the axis of said wheel to seal the pockets in the lower portion of said wheel, a delivery chute opening through said seal beneath said wheel, means for rotating said wheel, a hopper in said housing overlying said wheel for delivering material to said wheel, a suction pipe extending into said housing terminating above said hopper, a pipe having a diameter substantially greater than said suction pipe supported in said housing in axial alignment and spaced from said suction pipe, said last-named pipe having the end closest to said suction pipe open and the opposite end closed to serve as a velocity break for material delivered from said suction pipe prior to moving downwardly in said hopper to said wheel, an air outlet in said housing, and a filter for separating the material from the suction air in said housing between said suction pipe and said air outlet.

References Cited

UNITED STATES PATENTS

| | | | |
|---|---|---|---|
| 3,219,394 | 11/1965 | Moss et al. | 302—59 |
| 1,079,150 | 11/1913 | Sleeper | 222—368 X |
| 809,470 | 1/1906 | Schuman | 302—59 |
| 1,116,021 | 11/1914 | Cornish | 222—368 X |
| 2,104,881 | 1/1938 | McLemore | 302—49 X |
| 429,493 | 6/1890 | Allin | 302—49 X |
| 2,712,475 | 7/1955 | Lukes | 302—49 |

FOREIGN PATENTS

| | | | |
|---|---|---|---|
| 342,731 | 3/1919 | Germany | 302—49 |
| 433,986 | 4/1948 | Italy | 302—49 |

EVON C. BLUNK, Primary Examiner
W. S. CARSON, Assistant Examiner

U.S. Cl. X.R.
222—368; 302—62